United States Patent [19]

Poulin

[11] Patent Number: 4,492,053
[45] Date of Patent: Jan. 8, 1985

[54] AUTOMATIC HOOK SETTER

[76] Inventor: Gilles Poulin, 535 Richard, Rouyn-Noranda, Quebec, Canada, J9X 4L9

[21] Appl. No.: 513,277

[22] Filed: Jul. 13, 1983

[51] Int. Cl.³ .............................................. A01K 97/12
[52] U.S. Cl. ...................................................... 43/15
[58] Field of Search ................................ 43/15, 16, 17

[56] References Cited

U.S. PATENT DOCUMENTS

| | | | |
|---|---|---|---|
| 3,055,136 | 9/1962 | Scott | 43/15 |
| 3,412,499 | 11/1968 | Pastrovich | 43/15 |
| 3,897,646 | 8/1975 | Sheets | 43/15 |
| 4,031,651 | 6/1977 | Titze | 43/15 |
| 4,235,035 | 11/1980 | Guthrie | 43/15 |
| 4,270,298 | 6/1981 | Hodshire | 43/15 |
| 4,434,573 | 3/1984 | Hodshire | 43/15 |

Primary Examiner—Gene P. Crosby
Attorney, Agent, or Firm—Robert Mitchell; Guy Houle; Melvin Sher

[57] ABSTRACT

An automatic hook setting device is disclosed for setting in a fish a hook connected to a fishing line in response to a pull exerted by the fish on the line. When a fish pulls on the fishing line to pivotally move the front end of the line support member downwardly a distance exceeding a predetermined displacement, a trip element is moved to a release position and in turn releases an elastic band tension member so as to engage a fixed stop and cause the front end of the line support to jerk upwardly, thereby setting the hook in the fish.

15 Claims, 8 Drawing Figures

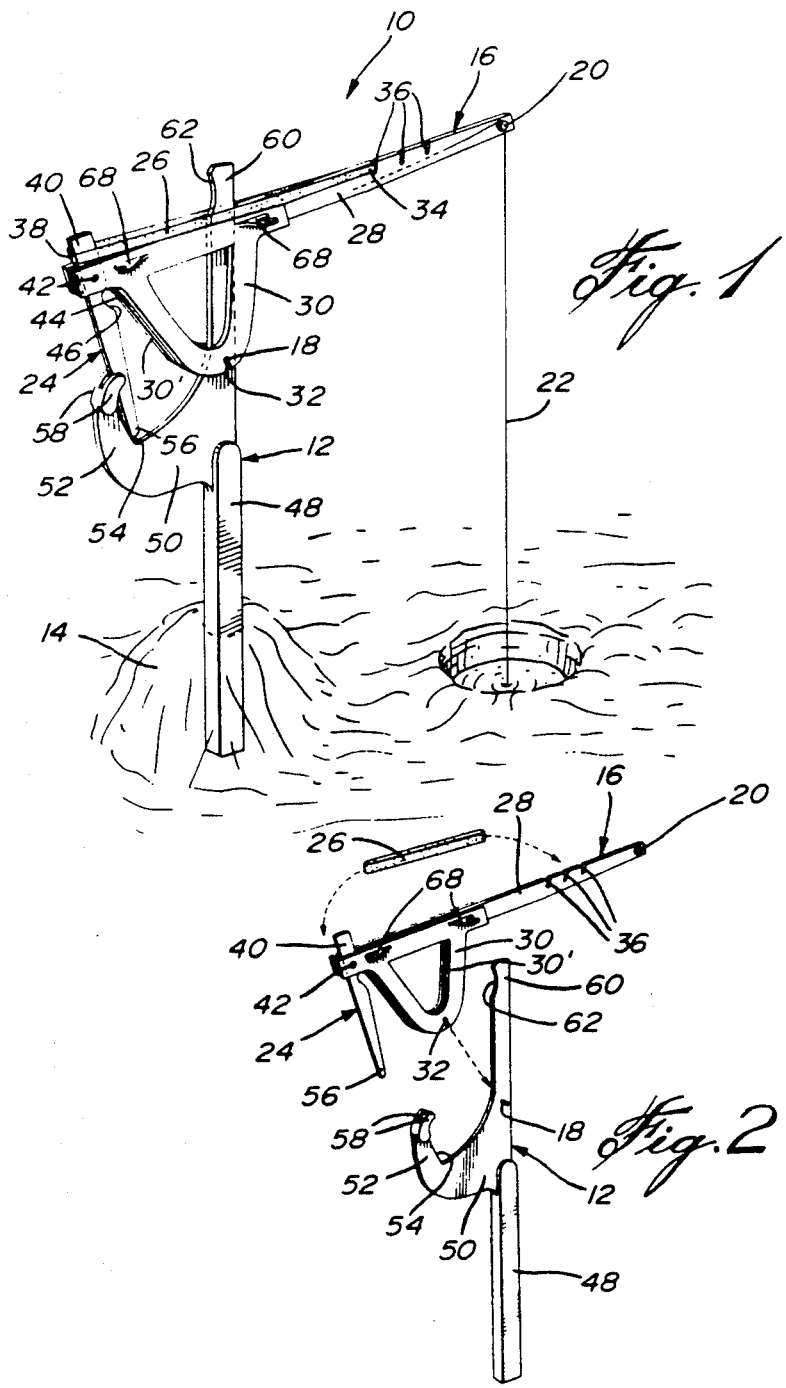

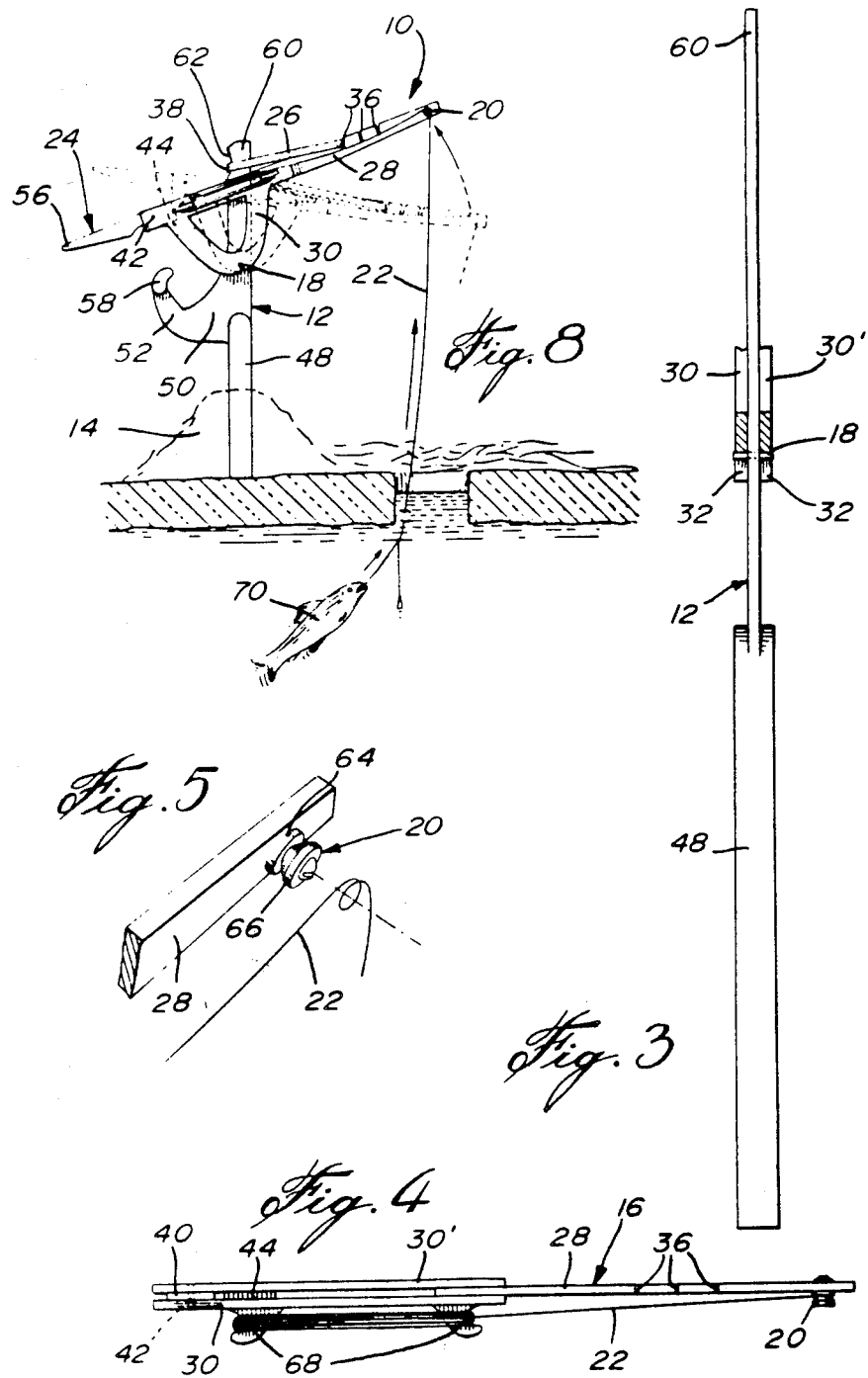

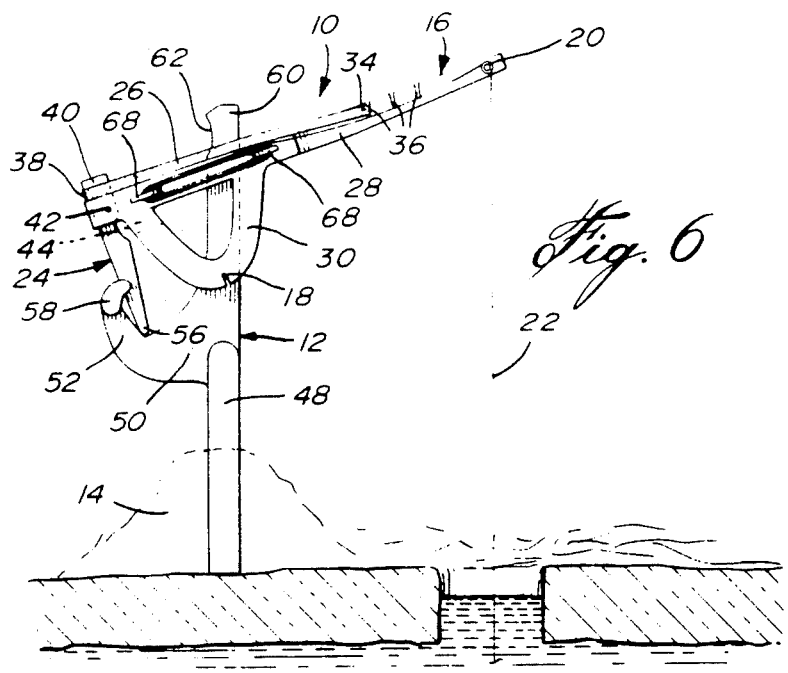
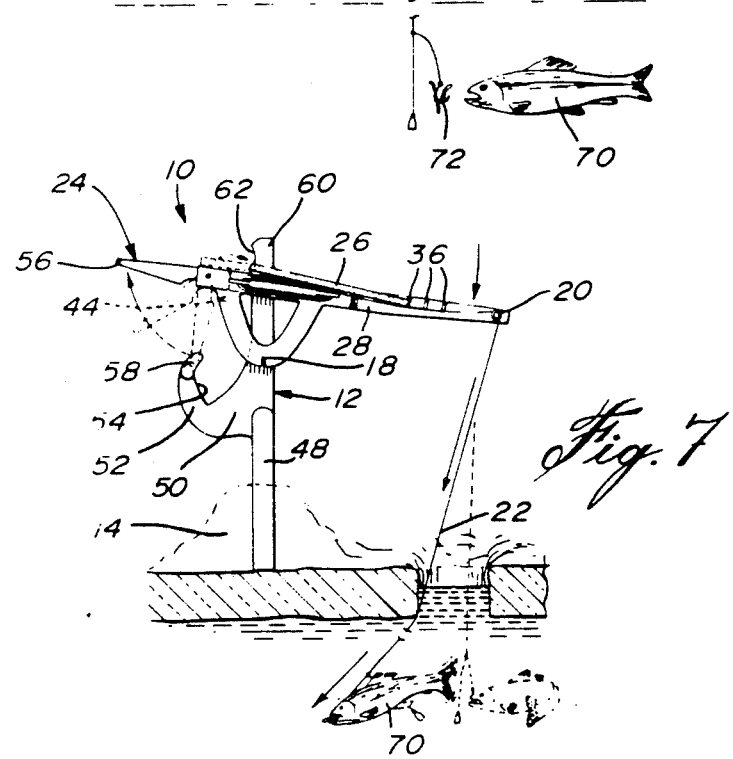

AUTOMATIC HOOK SETTER

BACKGROUND OF THE INVENTION

The present invention relates to improvements in fishing apparatuses and is more particularly concerned with an automatic hook setting device for setting in a fish a hook connected to a fishing line in response to a pull exerted by the fish on the line.

Various devices in the form of tripable fishing rod holders have heretofore been suggested. Such devices generally include a spring-loaded holder for the rod handle and are trigger-actuated by tension applied to the fishing line by the bite of a fish to move the pole in an upright position and impose a jerking movement on the line to set the hook in the mouth of the fish.

U.S. Pat. No. 3,412,499, for example, proposes a fishing rod holder which includes a rod support arm pivotally mounted on a vertical post for pivotal movement between a generally horizontal position and a generally upright position, and a spring for biasing the support arm toward the upright position. A trigger latch mechanism is provided for holding the arm in the horizontal position against the pressure of the spring. This latch mechanism comprises a first latch element pivotally mounted at one end on the support arm and carrying at its other end a rotatable round pin, and a second latch element pivotally mounted on a forward extension secured to the post. The second latch element is formed at one end with a hook for engaging the rotatable pin carried by the first latch element to thereby hold the support arm in the horizontal position. The second latch element is further provided at its other end with a fixed pin for frictional engagement with the fishing line. When the fishing rod is set in the holder with the fishing line running from the reel, around the fixed pin to the forward end of the rod and thence to the water, the tension imposed on the line by a fish pull will thus be transmitted to the fixed pin, causing the second latch element to pivotally move and its hook to release the rotatable pin whereupon the spring pivots the support arm into an upright position. As a result, a jerk is effected on the line, which causes the hook to be set in the mouth of the fish.

U.S. Pat. No. 4,235,035 discloses a similar tripable fishing rod holder. However, instead of employing two pivoted latch elements, use is made of an eyelet depending from the rod support, and a pivotally mounted latch having at its upper end a hook for engagement with the eyelet and, at lower end, an elongated trip for receiving a loop formed in the fishing line, passing beneath the trip. A tug on the line is first transmitted to the loop, causing an upward movement of the trip and a consequent swinging of the lower end of the latch. This results in the disengagement of the hook from the eyelet, whereupon the spring-loaded rod support freely swings upwardly in response to the action of the spring.

The devices of both the aforementioned patents are thus actuated by means of the fishing line which serves to move the latch either via a pin as in U.S. Pat. No. 3,412,499 or via a loop receiving trip as in the case of U.S. Pat. No. 4,235,035. Since the rod support is normally biased upwardly by the action of the spring and the latch serves to retain the rod support in the horizontal position against the upward force exerted by the spring, sufficient tension must be imposed by the fish on the fishing line in order to set off the device. Such tripable fishing rod holders generally are not sensitive enough to be sprung or set off in response to a fish lightly nibbling at a baited hook.

Other known devices have been proposed, for example in U.S. Pat. No. 4,270,298, with a view to increasing the sensitivity of release and the effectiveness of the hook-setting action. These devices, however, are quite intricate in structure, expensive and complicated to use.

SUMMARY OF THE INVENTION

It is therefore an object of this invention to provide an automatic hook setter which has improved sensitivity and yet is simple, inexpensive and noncomplicated.

In accordance with the invention, there is provided an automatic hook setter comprising an elongated main support member adapted to be held in a generally upright position, an elongated line support member having a front end and a rear end, the line support member being pivotally mounted on the main support member for pivotal movement in a substantially vertical plane about a pivot point located intermediate the front and rear ends, and means for securing a fishing line to the line support member adjacent the front end such that the line depends therefrom. An elongated tension member has one end connected to the line support member at a point intermediate the front end and the pivot point, the tension member being elastically stretchable in a direction towards the rear end of the line support member so as to cause a free end of the tension member to be displaced under tension in a direction towards the front end of the line support member. A trip element is provided for releasably holding the free end of the tension member whereby to releasably hold the tension member under tension, the trip element being pivotally connected to the line support member adjacent the rear end for pivotal movement between a loaded position whereat the trip element holds the tension member and an unloaded position whereat the trip element releases the tension member. The trip element when in the loaded position is normally urged to the unloaded position by the tension member.

The hook setting device of the invention further includes trip retaining means on the main support member for releasably retaining the trip element in the loaded position, the trip retaining means adapted to release the trip element when the front end of the line support member pivotally moves downwardly a distance exceeding a predetermined displacement, and stop means on the main support member adapted to engage the free end of the tension member for arresting same when released by the trip element and thereby causing the front end of the line support member to jerk upwardly.

Thus, when a fish pulls on the fishing line to pivotally move the front end of the line support member downwardly a distance exceeding the predetermined displacement, the trip retaining means releases the trip element which is thus moved to the unloaded position and in turn releases the tension member so as to engage the stop means and cause the front end of the line support to jerk upwardly, thereby setting the hook in the fish.

According to a preferred embodiment, the trip element is elongated and has a working end adapted to releasably hold the free end of the tension member and an opposite end adapted to engage the trip retaining means when in the loaded position, the trip element being pivotally connected intermediate the ends thereof to the line support member. On the other hand, the main support member is provided with a transverse extension defining an elbow having an upwardly extending arm and the trip retaining means comprises an abutment surface formed in the arm inwardly of the elbow for frictional slidable engagement with the opposite end of the trip element.

Preferably, the abutment surface extends along a path which has a predetermined length associated with the predetermined displacement and is located on or slightly beyond an arc of circle whose center is defined by the pivot point whereby to permit the opposite end of the trip element to slidably move upwardly along the path and beyond the predetermined length in response to the fish pull on the fishing line, so as to cause disengagement of the trip element from the abutment surface and consequent release of the trip element. When the path is located slightly beyond the arc of circle, there is less resistance to the sliding movement of the opposite end of the trip element on the abutment surface and thus an increased sensitivity of release in response to the fish pull.

The automatic hook setter of the invention may be utilized not only for ice fishing but also for fishing from a boat or a dock as well as from a stream or lake bank.

BRIEF DESCRIPTION OF THE DRAWINGS

Further features and advantages of the invention will become more readily apparent from the following description of a preferred embodiment thereof as illustrated by way of example in the accompanying drawings, in which:

FIG. 1 is a perspective view of an automatic hook setting device according to the invention;

FIG. 2 is an exploded view of the device shown in FIG. 1;

FIG. 3 is a fragmentary sectional front elevation view of the device of FIG. 1, showing the pivotal connection between the main support member and line support member thereof;

FIG. 4 is a top view of the line support member;

FIG. 5 is a fragmentary enlarged perspective view of the front end of the line support member, showing how a fishing line may be secured at that end; and FIGS. 6 through 8 are side elevation views showing how the device of FIG. 1 operates in response to a fish pull exerted on the fishing line, to automatically set a hook in the fish.

DESCRIPTION OF PREFERRED EMBODIMENTS

Referring first to FIG. 1, there is illustrated an automatic hook setting device generally designated by reference numeral 10 and seen installed for ice fishing. The device 10 comprises an elongated main support member 12 which is held in a generally upright position by means of a mound of snow and/or ice 14, and an elongated line support member 16 pivotally connected to the main support member 12 for pivotal movement in a vertical plane about a pivot pin 18 fixed to the member 12. The line support member 16 is provided at its front end with a knob 20 for securing a fishing line 22 thereto and carries at its rear end a pivotally mounted trip element 24. The trip element 24 is adapted to releasably hold under tension an elastic band 26 connected to the line support member 16.

The line support member 16 comprises a longitudinally extending arm 28 which is secured at one end thereof to a pair of mounting elements 30,30', the opposite free end of the arm 28 defining the front end of the line support member 16. The mounting elements 30 and 30' each have a triangular configuration and are disposed in opposite spaced relation to each other. The arm 28 extends in alignment with the upper corners of the mounting elements 30 and 30' whereas the lower corners thereof are pivotally connected to the main support member 12 by means of the pivot pin 18 so as to define a bell crank mounting. As best shown in FIGS. 2 and 3, each mounting element is formed at the lower corner thereof with a slot 32 receiving the pivot pin 18 which extends through the main support member 12 and projects from either side thereof. This permits the main support member 12 and the line support member 16 to be disengaged from one another when the device 10 is not in use and to thus provide a compact arrangement of only two parts for convenient handling, transport and/or storage.

The elastic band 26 has one end 34 detachably connected to the arm 28 by means of a slot 36 which is formed in the arm and receives the elastic band in tight frictional engagement. In order to vary the tension of the elastic band 26, there is provided a plurality of such slots 36 which are spaced from each other along the length of the arm 28. The elastic band 26 is stretchable in a direction towards the rear end of the line support member 16 such that its free end 38 may be displaced under tension towards the front end. As shown in FIG. 1, the free end 38 of the elastic band 26 is positioned over the working end 40 of the trip element 24 which releasably holds the band under tension.

The trip element 24 is pivotally connected to the line support member 16 at the rear end thereof between the mounting elements 30 and 30', by means of the pivot pin 42. It is pivotally movable between a loaded position shown in FIGS. 1 and 6, whereat the trip element holds the elastic band 26 under tension, and an unloaded position shown in FIG. 7, whereat the trip element releases the elastic band. The trip element 24 when in the loaded position is normally urged to the unloaded position by the pulling force exerted by the elastic band 26. A spacer 44 is fixed between the mounting elements 30 and 30' adjacent the rear end of the line support member 16, as best shown in FIG. 4. The spacer 44 also serves as a stop for arresting the working end 40 of the trip element 24 when moved to the unloaded position. A recess 46 is formed in the trip element 24 for clearing the spacer 44, when in the loaded position.

In order to releasably retain the trip element 24 in the loaded position, the main support member 12 is provided above its stem portion 48 with a rearward extension 50 defining an elbow having an upwardly extending arm 52 formed with an inner abutment surface 54 for frictional slidable engagement with the other end 56 of the trip element 24, which thus constitutes a follower end. The abutment surface 54 extends along a path located slightly beyond an arc of circle whose center is defined by the pivot pin 18 such as to permit the follower end 56 of the trip element 24 to slidably move upwardly without hardly any resistance at all when the front end of the line support member 16 is pivotally moves downwardly in response to a fish pull exerted on the fishing line 22. The path defined by the abutment surface 54 has also a predetermined length which is associated with a predetermined downward displacement of the front end of the line support member 16. Thus, when a fish pulling on the fishing line 22 pivotally moves the front end of the line support member 16 downwardly a distance exceeding such predetermined displacement which, for example, may be 8 inches, the follower end 56 of the trip element 24 slidably moves upwardly on the abutment surface 54 along the path defined thereby and beyond its predetermined length, causing disengagement of the follower end 56 from the abutment surface 54 and consequent release of the trip element 24. In order to guide the follower end 56 along the abutment surface 54, a pair of spaced-apart guide fingers 58 are arranged adjacent the upper extremity of the arm 52 and guidingly receive the trip element 24 therebetween.

As shown, the main support member 12 extends upwardly between the mounting elements 30,30' and beyond the upper corners thereof such that its upper end 60 defines a stop for arresting the free end 38 of the elastic band 26 which is released by the trip element 24 when moved to the unloaded position. The upper end 60 is formed with a recess 62 for receiving the free end 38 of the elastic band 26.

The fishing line securing knob 20 which is shown in greater details in FIG. 5 comprises a planar disk-shaped element 64 and a cone-shaped element 66 connected at the apex thereof to the element 64. Both such elements 64 and 66 are adapted to wedge the fishing line 22 when wound therebetween. A single winding of the fishing line 22 is generally sufficient to tightly wedge the line.

Finally, the mounting element 30 is advantageously provided adjacent the upper corners thereof with a pair of line furling brackets 68 for holding a predetermined length of fishing line 22.

Turning to the operation of the hook setting device 10, which is illustrated in FIGS. 6–8, the device is set by first positioning the trip element 24 such that its follower end 56 engages the abutment surface 54 and then placing the free end 38 of the elastic band 26 over the working end 40 of the trip element 24 so as to hold the band under tension, as shown in FIG. 6. When a fish 70 bits the baited hook 72 connected to the fishing line 22 and pulls the line to pivotally move the front end of the line support member downwardly a distance exceeding the aforesaid predetermined displacement, as shown in FIG. 7, the follower end 56 of the trip element 24 slidably moves upwardly on the abutment surface 54 along the path defined thereby and beyond its predetermined length, causing disengagement of the follower end 56 from the abutment surface 54 and consequent release of the trip element 24. The latter thus pivotally moves to the unloaded position shown in solid line in FIG. 7, the working end 40 abutting against the stop 44 and thereby releasing the free end 38 of the elastic band 26 which is urged towards the front end of the line support member 16.

As the free end 38 of the elastic band 26 hits the stop 60 defined at the upper end of the main support member 12, the tension of the band 26 which is still in the stretched condition causes the front end of the line support member 16 to jerk upwardly and to thus impose a similar movement on the fishing line 22 which is secured thereto, as shown in FIG. 8. As a result, the hook is firmly set in the fish mouth.

It should be noted that the elastic band 26 once released with its free end received in the recess 62 enables the fishing line 22 to be maintained under tension as the hooked fish 70 tries to escape, thereby preventing the line 22 from breaking and thus loosing the catch. Moreover, as shown in FIG. 8, the working end 40 of the trip element 24 is adapted to tightly frictionally engage the inner sidewalls of the mounting elements 30 and 30' so as to permit the trip element 24 to be retained in the unloaded position, as an axial extension of the line support member 16, and thus provide an indication of a catch. In other words, the trip element 24 in the unloaded position also serves as an indicator or "flag" that a fish has been caught.

Although the automatic hook setting device 10 has been illustrated in conjunction with ice fishing, it is apparent that it may be used for other types of fishing. For example, the stem 48 of the main support member 12 may be clamped to a dock or to the side of a rowboat or other vessel. Moreover, the device 10 can be used to mount an auxiliary fishing line from a fishing rod positioned nearby.

I claim:

1. An automatic hook setting device for setting in a fish a hook connected to a fishing line in response to a pull exerted by the fish on the line, said device comprising:

an elongated main support member adapted to be held in a generally upright position;

an elongated line support member having a front end and a rear end, said line support member being pivotally mounted on said main support member for pivotal movement in a substantially vertical plane about a pivot point located intermediate said front and rear ends;

means for securing said fishing line to said line support member adjacent said front end such that said line depends therefrom;

an elongated tension member having one end connected to said line support member at a point intermediate said front end and said pivot point, said tension member being elastically stretchable in a direction towards the rear end of said line support member so as to cause a free end of said tension member to be displaced under tension in a direction towards the front end of said line support member;

a trip element for releasably holding said free end of said tension member whereby to releasably hold said tension member under tension, said trip element being pivotally connected to said line support member adjacent said rear end for pivotal movement between a loaded position whereat said trip element holds said tension member and an unloaded position whereat said trip element releases said tension member, said trip element when in the loaded position being normally urged to said unloaded position by said tension member;

trip retaining means on said main support member for releasably retaining said trip element in said loaded position, said trip retaining means adapted to release said trip element when said front end of said line support member pivotally moves downwardly a distance exceeding a predetermined displacement; and stop means on said main support member adapted to engage said free end of said tension member for arresting same when released by said trip element and thereby causing said front end of said line support member to jerk upwardly;

whereby a fish pulling on the fishing line to pivotally move the front end of said line support member downwardly a distance exceeding said predetermined displacement, causes said trip retaining means to release said trip element which is thus moved to said unloaded position and in turn releases said tension member so as to engage said stop means and cause said front end of said line support to jerk upwardly, thereby setting said hook in said fish.

2. A device as claimed in claim 1, wherein said trip element is elongated and has a working end adapted to releasably hold said free end of said tension member and an opposite end adapted to engage said trip retaining means when in said loaded position, said trip element being pivotally connected intermediate the ends thereof to said line support member.

3. A device as claimed in claim 2, wherein said main support member is provided with a transverse extension defining an elbow having an upwardly extending arm and wherein said trip retaining means comprises an abutment surface formed on said arm for frictional slidable engagement with said opposite end of said trip element.

4. A device as claimed in claim 3, wherein said abutment surface extends along a path which has a predetermined length associated with said predetermined displacement and said path joining the concavity of an arc of circle whose center is defined by said pivot point whereby to permit said opposite end of said trip element to slidably move upwardly along said path and beyond said predetermined length in response to said fish pull on said fishing line, so as to cause disengagement of said trip element from said abutment surface and consequent release of said trip element.

5. A device as claimed in claim 4, wherein said path joins the concavity of said arc of circle to provide less resistance to the sliding movement of said opposite end of said trip element on said abutment surface and thereby increase the sensitivity of release in response to said fish pull.

6. A device as claimed in claim 4, wherein said arm is provided with means for guiding said opposite end of said trip element along said abutment surface.

7. A device as claimed in claim 6, wherein said guide means comprise a pair of spaced-apart guide fingers arranged adjacent an upper extremity of said arm and guidingly receiving therebetween said trip element.

8. A device as claimed in claim 1, wherein said line support member comprises a longitudinally extending arm which is secured at one end thereof to a pair of mounting elements and has an opposite free end defining said front end of said line support member, said mounting elements each having a triangular configuration with two upper corners and a third lower corner and being disposed in opposite spaced relation to each other, and wherein said arm extends in substantial alignment with the upper corners of said mounting elements with the lower corners thereof being pivotally connected to said main support member whereby to define a bell crank mounting.

9. A device as claimed in claim 8, wherein each said mounting element is formed at the lower corner thereof with a slot receiving a pivot pin extending through said main support member, whereby to permit said main support member and said line support member to be disengaged from one another when not in use.

10. A device as claimed in claim 8, wherein said main support member extends upwardly through the space defined between said mounting elements and beyond the upper corners thereof such that an upper end of said main support member defines said stop means for arresting said free end of said tension member when released by said trip element.

11. A device as claimed in claim 10, wherein said upper end of said main support member is formed with a recess for receiving said free end of said tension member.

12. A device as claimed in claim 8, wherein said arm is formed with a plurality of slots for receiving in tight frictional engagement said one end of said tension member, said slots being spaced from each other along the length of said arm whereby to permit the tension of said tension member to be varied.

13. A device as claimed in claim 12, wherein said tension member is an elastic band.

14. A device as claimed in claim 8, wherein one of said mounting elements is provided adjacent the upper corners thereof with line furling brackets.

15. A device as claimed in claim 1, wherein said line securing means comprise a planar disk-shaped element fixed to said line support member and a cone-shaped element connected at the apex thereof to said disk-shaped element, said disk-shaped element and cone-shaped element adapted to wedge said fishing line when wound therebetween.

* * * * *